Sept. 9, 1952         M. ROSS         2,609,933
FILTER
Filed June 3, 1948
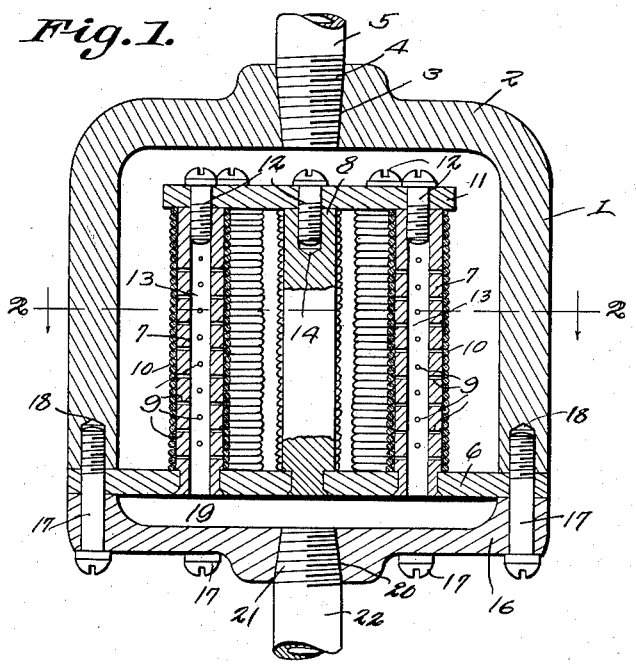
Fig.1.
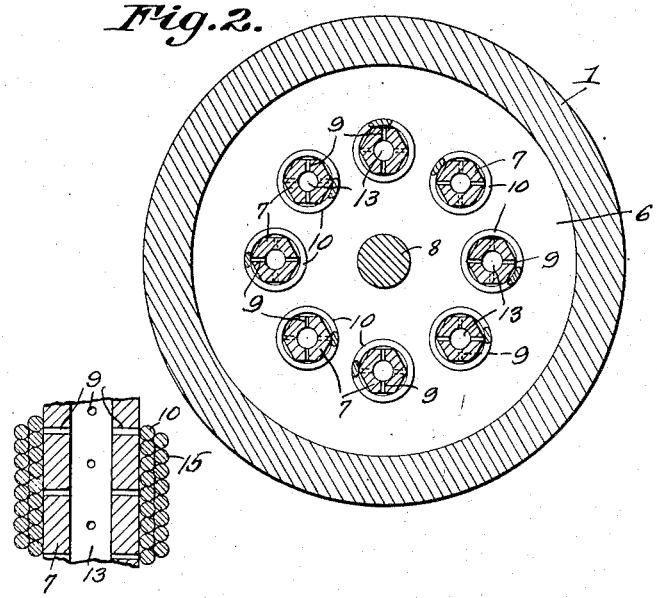
Fig.2.
Fig.3.
M. Ross
INVENTOR
BY *C. A. Snow & Co.*
ATTORNEYS.

Patented Sept. 9, 1952

2,609,933

UNITED STATES PATENT OFFICE 2,609,933

FILTER

Margaret Ross, Lincoln Park, Mich.

Application June 3, 1948, Serial No. 30,879

1 Claim. (Cl. 210—184)

This invention relates to improvements in filters.

An object of the invention is to provide an improved filter for filtering various liquids, and means for selectively controlling the filtering action of said filter.

Another object of the invention is to provide an improved adjustable spring controlled filter for filtering various kinds and quantities of liquids.

A further object of the invention is to provide an improved liquid filter which will be highly efficient in operation, and relatively inexpensive to manufacture and produce.

Other objects will appear as the description proceeds.

In the accompanying drawing which forms a part of this application,

Figure 1 is a vertical sectional view through the improved liquid filter;

Fig. 2 is a sectional view taken on the line 2—2 of Fig. 1, and

Fig. 3 is an enlarged detail sectional view through a portion of one of the apertured filter sleeves showing a double coil spring disposed thereabout.

Like characters of reference are used throughout the following specification and the accompanying drawing to designate corresponding parts.

In carrying out the invention, there is shown and provided a cylindrical filter housing 1 having one end closed as at 2, and its opposite end open. The closed end 2 of the filter housing 1 is thickened at its central portion and is apertured at 3 and threaded to receive the threaded end 4 of a supply or inlet pipe 5 through which the liquid to be filtered passes into the filter housing 1.

A filter supporting plate 6 of circular shape and of the same diameter as the diameter of the filter housing 1 is provided, and supports a plurality of hollow hexagonal filtering spacer tubes 7 in circumferential arrangement with their ends extending through said plate 6 and swaged into locked position thereon. A centrally disposed stud 8 is supported axially of the plurality of filtering spacer tubes 7 and is likewise extended through the plate 6 and swaged into position thereon.

Vertically spaced passages 9 are bored or drilled radially through the plurality of hexagonal filtering spacer tubes 7 for permitting the liquid after filtering to pass into the hollow tubes 7 and out through their ends below the plate 6.

Coil springs 10 will be disposed about the plurality of hexagonal filtering spacer tubes 7 with an end of each spring engaging the plate 6, and their opposite ends engaging and held in place by a retaining cap disk 11, which will be held in place by the threaded screws 12 extending therethrough and into the threaded ends of the bores 13 formed in the tubes 7 and in the bore 14 in the centrally disposed stud 8. If desired, a second coil spring 15 may be disposed about the inner coil spring 10 about each filtering spacer tube 7 to provide a greater filtering action. Further variation in filtering action may be had by using more or less coils or convolutions in the coil springs 10.

The filter supporting plate 6 will be disposed upon the open end of the filter housing 1, and the flanged filter closure head 16 will be disposed in contact therewith and secured by the threaded bolts 17 which extend through the head 16, the plate 6 and into the threaded bores 18 in the filter housing 1.

It will be seen that there is a liquid collecting chamber 19 formed between the plate 6 and the filter housing closure head 16. Also, the central portion of the head 16 will be thickened and axially ported at 20 to receive the threaded end 21 of the outlet pipe 22.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A liquid filter including a cylindrical housing having a closed end and an open end, a filter supporting plate removably connected to the housing and disposed over the open end of said housing, a removable closure head secured over said supporting plate in spaced relation therewith providing a collecting chamber, a plurality of independent hexagonal filtering tubes providing flat surfaces, supported circumferentially upon said plate in spaced relation with each other, the tubes extending through said plate communicating with the collecting chamber, said tubes having radially extending passages through their walls, certain of said radially extended passages extending through flat surfaces, the remaining passageways of each tube extending through the side edges of the flat surfaces of the tubes, a cap plate secured to the free ends of the tubes, coiled filtering springs encircling the tubes in contact with the side edges of the flat surfaces of the tubes and inlet and outlet pipes connected respectively with said housing and said closure head.

MARGARET ROSS.

REFERENCES CITED

The following references are of record in the file of this patent:

UNITED STATES PATENTS

| Number | Name | Date |
|---|---|---|
| 248,843 | Bower | Nov. 1, 1881 |
| 360,441 | Howes | Apr. 5, 1887 |
| 802,714 | Smith | Oct. 24, 1905 |
| 2,065,263 | Beldam | Dec. 22, 1936 |
| 2,202,191 | Cuno | May 28, 1940 |
| 2,383,672 | Neisingh | Aug. 28, 1945 |
| 2,422,647 | Vokes | June 17, 1947 |

FOREIGN PATENTS

| Number | Country | Date |
|---|---|---|
| 6,760 | Great Britain | Mar. 30, 1909 |
| 296,359 | Great Britain | Aug. 30, 1928 |